(12) United States Patent
Cheng et al.

(10) Patent No.: US 12,406,152 B2
(45) Date of Patent: Sep. 2, 2025

(54) ASPECT-AWARE SENTIMENT ANALYSIS OF USER REVIEWS SUPPORTING AI-BASED DECISION MAKING

(71) Applicant: NEC Laboratories America, Inc., Princeton, NJ (US)

(72) Inventors: Wei Cheng, Princeton Junction, NJ (US); Wenchao Yu, Plainsboro, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 536 days.

(21) Appl. No.: 17/577,745

(22) Filed: Jan. 18, 2022

(65) Prior Publication Data

US 2022/0237386 A1     Jul. 28, 2022

Related U.S. Application Data

(60) Provisional application No. 63/140,272, filed on Jan. 22, 2021.

(51) Int. Cl.
| | | |
|---|---|---|
| *G06F 40/40* | (2020.01) | |
| *G06F 40/205* | (2020.01) | |
| *G06F 40/284* | (2020.01) | |
| *G06Q 30/02* | (2023.01) | |
| *G06Q 30/0601* | (2023.01) | |

(52) U.S. Cl.
CPC ............ *G06F 40/40* (2020.01); *G06F 40/205* (2020.01); *G06F 40/284* (2020.01); *G06Q 30/0281* (2013.01); *G06Q 30/0631* (2013.01)

(58) Field of Classification Search
CPC ....... G06F 40/40; G06F 40/205; G06F 40/284
USPC ................... 704/10, 231, 232, 251
See application file for complete search history.

(56) References Cited

U.S. PATENT DOCUMENTS

| | | | |
|---|---|---|---|
| 9,633,007 B1 | 4/2017 | Brun et al. | |
| 2015/0227528 A1* | 8/2015 | Kang | G06F 16/24578 707/750 |
| 2020/0073937 A1* | 3/2020 | Zhao | G06F 40/30 |

FOREIGN PATENT DOCUMENTS

KR     1020140053717 A     5/2014

OTHER PUBLICATIONS

Baccianella, Stefano, et al. "Sentiwordnet 3.0: an enhanced lexical resource for sentiment analysis and opinion mining", InLrec, vol. 10, No. 2010. May 17, 2010, pp. 2200-2204.

(Continued)

*Primary Examiner* — George C Monikang
(74) *Attorney, Agent, or Firm* — Joseph Kolodka (57) ABSTRACT

Rating prediction systems and methods include extracting aspect-sentiment pairs from an input text. An attention-property-aware rating is estimated for the input text using the extracted aspect-sentiment pairs with a neural network that captures implicit and explicit features of the text. A response to the input text is performed based on the estimated rating.

16 Claims, 9 Drawing Sheets

(56) References Cited

OTHER PUBLICATIONS

Dai, Hongliang, et al. "Neural aspect and opinion term extraction with mined rules as weak supervision", Proceedings of the 57th Annual Meeting of the Association for Computational Linguistics. Jul. 2019, pp. 5268-5277.

Devlin, Jacob, et al. "Bert: Pre-training of deep bidirectional transformers for language understanding", Proceedings of NAACL-HLT 2019. Jun. 2019, pp. 4171-4186.

Pontiki, Maria, et al. "SemEval-2015 Task 12: Aspect Based Sentiment Analysis", Proceedings of the 9th International Workshop on Semantic Evaluation (SemEval 2015). Jun. 2015, pp. 486-495.

\* cited by examiner

Input:
- PMI: polarity seeds $\{s^+, s^-\}$, context window size $w_{ctx}$, and polarity threshold $\lambda$;
- NN: trained NN extraction model Ec;
- Lex: sentiment lexicon $ST_{Lex}$

Output: Sentiment term set $ST$

Data: Review-rating corpus $R$

```
   /* Initialize STPMI and STNN           */
1  STPMI, STNN ← ∅, ∅
   /* Build STPMI                          */
2  PMI[·, ·] ← CalcPMI(R, wctx), Eq (2)
3  Pol[w] ← CalcPol(PMI, s+, s-), Eq (1)
4  foreach token w in R do
5  |  if w satisfies POS-tag condition and
   |     |Pol[w])| ≥ λ then
6  |  |  Add w to STPMI
7  |  end
8  end
   /* Build STNN                           */
9  foreach review r in R do
10 |  T ← Ec(r)   // annotate r with Ec
   |  /* B-S and I-S denote sentiment
   |     terms in text.                    */
11 |  foreach B-S and I-S term t in T do
12 |  |  Add t to STNN
13 |  end
14 end
   /* Build and output ST                  */
15 ST = STPMI ∩ STNN ∩ STLex
16 return ST
```

FIG. 5

Input: Sentiment terms $ST$, dependency parser DepParser, and frequency threshold $c$
Output: AS-pairs
Data: Review-rating corpus $R$ /* Init. AS-pair related sets */
1   *AS-cand, AS-pairs* ← ∅, ∅
/* Extract AS-pair candidates */
2   foreach $r \in R$ do
3       dep-graph$_r$ ←DepParser($r$)
4       foreach dependency relation $r_{dep}$ in dep-graph$_r$ do
5           if $r_{dep}$ is nsubj+acomp or $r_{dep}$ is amod then
6               Add corresponding (*noun, adj.*) tuple to *AS-cand* (Figure 2).
7           end
8       end
9   end
/* Filter out non-AS-pairs by $ST$ and frequency. */
10  foreach (*noun, adj.*) tuple in *AS-cand* do
11      if *adj.* ∈ $ST$ and freq[*noun*] > $c$ then
12          Add (*noun, adj.*) to *AS-pairs*
13      end
14  end
15  return *AS-pairs*

ASPECT-AWARE SENTIMENT ANALYSIS OF USER REVIEWS SUPPORTING AI-BASED DECISION MAKING

RELATED APPLICATION INFORMATION

This application claims priority to U.S. Provisional Patent Application No. 63/140,272, filed on Jan. 22, 2021, incorporated herein by reference in its entirety.

BACKGROUND

Technical Field

The present invention relates to sentiment analysis, and, more particularly, to automated analysis of user reviews.

Description of the Related Art

User reviews of products and services provide information about users' subjective feelings. Learning user preferences from such feedback can help to guide marketing and other decision-making. However, existing sentiment analysis approaches dismiss user attention toward the different properties of goods or services. Thus, such sentiment analysis fails to extract the strength of users' attention to certain properties, which can dominate a user's attitude and affect the generosity of their rating.

SUMMARY

A rating-prediction method includes extracting aspect-sentiment pairs from an input text. An attention-property-aware rating is estimated for the input text using the extracted aspect-sentiment pairs with a neural network that captures implicit and explicit features of the text. A response to the input text is performed based on the estimated rating.

A rating prediction system includes a hardware processor and a memory that stores a computer program. When executed by the hardware processor, the computer program causes the hardware processor to extract aspect-sentiment pairs from an input text, to estimate an attention-property-aware rating for the input text using the extracted aspect-sentiment pairs with a neural network that captures implicit and explicit features of the text, and to perform a response to the input text based on the estimated rating.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Rating prediction can be performed using written review information, generating a numerical rating value based on an input review of a product or service. This can be performed in a two-step process that uses unsupervised aspect-sentiment pair extraction (ASPE) that extracts (aspect,sentiment) pairs from raw review data, followed by attention-property-aware rating estimation (APRE), which uses the (aspect, sentiment) pairs as user attention and item property indicators by jointly considering frequency and sentiment of aspect mentions.

APRE may encode text by a contextualized language encoder and processes implicit text features in addition to the annotated terms, forming a dual-channel rating regression. The joint efforts of APRE and ASPE can extract explicit aspect-based attention and property information and provide rating predictions with good performance.

Aspect-level user attitude differs from user preference in that the user attitude produced by the interaction of user attention and item properties are sophisticated and granular attitude sentiments. Preferences, meanwhile, are coarse sentiments such as, "like," "dislike," or "neutral." Whereas preference-based models may infer that a first and second reviewers like headsets based on their high ratings for a headset, an attitude-based approach can further identify that it is headset comfort that matters to one of the users, rather than simply that the item is a headset. Aspect-level attitude modeling signifies a more accurate and informative personalization than preference-based modeling.

Consider the following example reviews:

Review 1: 5 stars. "Comfortable. Very high quality sound . . . . Mic is good too. There is a switch to mute your mic . . . I wear glasses and these are comfortable with my glasses on.

Review 2: 3 stars. "I love the comfort, sound, and style, but the mic is complete junk!"

Review 3: 5 start. "This one feels like a pillow, there's nothing wrong with the audio and it does the job. The only con is that the included microphone is pretty bad."

Table 1 below shows how these reviews can be broken up into different aspects, with respective sentiments being expressed.

TABLE 1

| Review number | Microphone | Comfort | Sound quality |
|---|---|---|---|
| Review 1 | good (satisfied) | comfortable | high quality (praising) |
| Review 2 | complete junk (angry) | love | love |
| Review 3 | pretty bad (unsatisfied) | like a pillow (enjoyable) | nothing wrong (neutral) |

In some cases, the respective sentiment is classified to determine how the user feels about the aspect. For example, the first reviewer is satisfied with the microphone and praises the sound quality, whereas the third reviewer is unsatisfied with the microphone and enjoys the comfort of the product. This table illustrates the impact of users' attitudes. The microphone quality is controversial, since the second and third reviewers criticize it, but the first reviewer praises it. The first and second reviewers disagree regarding the microphone, which is the second reviewers major concern, resulting in a divergence in the ratings. However, the third reviewer neglects that disadvantages and rates the product highly for its superior comfort.

A granular understanding of the users' differing sentiments toward different aspects of the product/service can be based on a clear and definitive identification of the aspects. Rather than using latent or implicit aspects, where there may be no real or justifiable semantic understanding of the aspects, and where different aspects may have semantic overlap that may undermine their effectiveness, sentiment term extraction may instead take advantage of unsupervised neural network processing to identify aspect information from existing corpuses.

Figure 1:
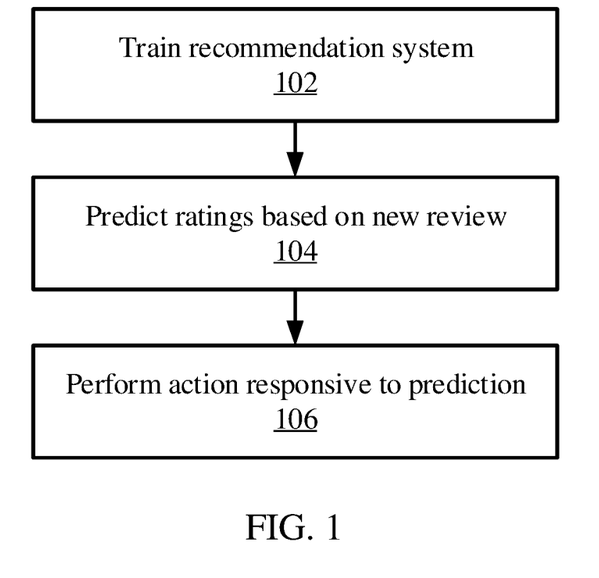
FIG. 1 is a block/flow diagram of a method for predicting ratings based on written text and responding to such predictions, in accordance with an embodiment of the present invention.

Referring now to FIG. 1, a method for predicting and responding to user ratings is shown. Block 102 trains a recommendation system based on a corpus of review text and associated user ratings for one or more goods or services. This recommendation system may be implemented using neural networks, for example to perform APRE. As will be described in greater detail below, the APRE model may be trained to extract aspect/sentiment pairs from textual rating information and to generate numerical ratings from the extracted pairs. ASPE need not have specific training and testing, since it is used for preprocessing to extract the (aspect,sentiment) pairs.

Block 104 thus predicts numerical ratings based on an input textual review. The trained ASPE model identifies (aspect,sentiment) information from the textual review, which is used as input to the APRE model. The APRE model uses information about the user's attention to predict a numerical rating for the input textual review.

Block 106 uses the generated rating to perform a responsive action. For example, block 106 may make a recommendation to the user who wrote the input textual review. The numerical rating helps to identify other products/services that the user might be interested in, so that the user is likely to purchase those goods/services. For example, if a first user gives high ratings to a first product, and said it was because the product has good battery life, then other users' reviews of a second product that mention good battery life may be used to determine that the first user would also rate the second product highly. Block 106 could therefore recommend the second product to the first user.

Although the present examples are described with specific attention to the use case of recommending products to users, other uses are also contemplated. For example, recommendations for online dating may be made in a similar fashion, where a user's messages can help to determine what qualities they look for in a partner.

Review-based rating prediction involves two kinds of entities: users $U=\{u_1, \ldots, u_m\}$ and items $T=\{t_1, \ldots, t_n\}$. A user u writes a review for an item t in $R=\{r_{u,t}\}$, providing a corresponding rating score $S=\{s_{u,t}\}$. The term $R^u$ denotes all reviews made by a user u, and the term $R^t$ denotes all reviews received by an item t. A rating regressor function $\mathcal{F}$ takes as input a tuple that describes a review-and-rate event of (u,t) and corresponding review sets $R^u$ and $R^t$ and outputs a rating score $s_{u,t}$ by: $\hat{s}_{u,t} = \mathcal{F}(u, t, R^u, R^t)$.

The rating regressor function $\mathcal{F}$ may be expressed as a pipeline of two tightly coupled sub-functions, including ASPE and APRE. The unsupervised ASPE label (aspect, sentiment) pairs are used by APRE to capture user attention and item properties and to predict rating scores.

Figure 2:
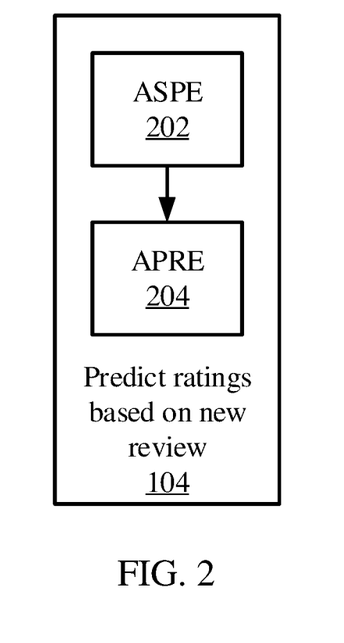
FIG. 2 is a block/flow diagram of a method for predicting ratings based on aspect-sentiment pair extraction, in accordance with an embodiment of the present invention.

Referring now to FIG. 2, additional detail on the prediction of ratings based on a new review 104 is shown. ASPE model 202 processes the input recommendation text to generate (aspect,sentiment) pairs. Given the reviews and the corresponding (aspect,sentiment) pairs, APRE model 204 generates a numerical rating using a score regression.

The sentiment extraction of APSE 202 may integrate multiple approaches to identifying sentiment terms. For example, pointwise mutual information may be used to measure statistical word associations within a text corpus. The sentiment polarity (e.g., positive vs negative) of words may be measured with the help of a small number of sentiment seed words. Candidate sentiment terms that satisfy part-of-speech patterns may be extracted and the polarity of each candidate term w may be measured by:

$$\text{Polarity}(w) = \sum_{s^+} PMI(w, s^+) - \sum_{s^-} PMI(w, s^-)$$

where $s^+$ represents positive sentiment seed words and $s^-$ represents negative sentiment seed words.

Given a sliding window-based word context sampler ctx, the PMI(•,•) between words may be defined as:

$$PMI(w_1 w_2) = \log \frac{p(w_1, w_2)}{p(w_1)p(w_2)}$$

where p(•) is a probability estimated by token counts, $$p(w_1, w_2) = \frac{|\{ctx \mid w_1, w_2 \in ctx\}|}{\text{total } \#ctx},$$

and $$p(w_1) = \frac{|\{ctx \mid w_1 \in ctz\}|}{\text{total } \#ctx}.$$

Sentiment tokens with strong polarities, both positive and negative, may be collected as $ST_{PMI}$.

Another approach may include the use of a coextraction model to label (aspect,similarity) pairs in the domain of training data. For sentiment terms with consistent semantics in different domains, such as "good" and "great," neural network models can provide robust extraction recall. A stochastic deep resilient network (SDRN) may be used to generate $ST_{NN}$. A sentiment lexicon can be integrated to provide another source of sentiment terms, $ST_{knowledge}$.

These three sets of sentiment terms, $ST_{PMI}$, $ST_{NN}$, and $ST_{knowledge}$, are joined to build an overall set as $ST = ST_{PMI} \cup ST_{NN} \cup ST_{knowledge}$. The three different approaches to generating sentiment terms reinforce one another. For example, sentiment terms with low polarity scores can be captured by the neural network using a learned pattern, and terms that are out of the domain of the training data for the neural network may be captured by the lexicon.

Pair candidates may be labeled using dependency parsing, and non-sentiment-carrying candidates may then be filtered out using the extracted sentiment set ST. Dependency parsing extracts grammatical dependency relations between the words in a sentence. Some nouns, which may be considered potential aspects, are modified by adjectives with two types of dependency relations, such as amod and nsubj+acomp. Pairs of nouns and corresponding adjectives may be extracted as (aspect,sentiment) pairs. For example, the amod relation may identify when an adjective modifies a noun, and the nsubj+acomp may identify a verb's subject as an aspect and may identify a comparative word as the sentiment.

The pair candidates may be noisy, as not all adjectives that are temporarily labeled as sentiment candidates have sentiment inclination. The set ST may be used to filter out non-sentiment-carrying candidates having adjectives that are not in ST, producing an output (aspect,sentiment) pair set for review. A special aspect token may be used for the nsubj+acomp rule, where nsubj maybe a pronoun of the item (e.g., "it" or "they").

The numerical rank generation of APRE model 204 may accept reviews and (aspect,sentiment) pairs and may output ratings associated with respective reviews. Language may be encoded into vectorized representations, with explicit and implicit features being analyzed to compute a score regression. APRE model 204 uses aspect information by incorporating a $d_a$-dimensional aspect representation $\alpha_i \in \mathbb{R}^{d_a}$ in each side of the substructures for review encoding. The k aspect embeddings for the users may be denoted as $A^u = \{a_1^u, \ldots, a_k^u\}$ and aspect embedding for items be denoted as $A^t$, where $d_a$ is a number of dimensions of aspect representations.

Reviews may be encoded into a low-dimensional token embedding, for example using a transformer-based contextualized language encoder. For each review r in $R^u$ or $R^t$, the resulting encoding $H^0 \in \mathbb{R}^{|r|+2 \times d_e}$ may include $(|r|+2)$ $d_e$-dimensional contextualized vectors: $H^0 = \{h_{[CLS]}^0, h_1^0, \ldots, h_{|r|}^0, h_{[SEP]}^0\}$, where [CLS] and [SEP] are tokens that indicate starts and separators of sentences, where $d_e$ is a number of dimensions of contextualized vectors.

A trainable linear transformation may be used to adapt raw token representations from $H^0$ to the task as $H^1$, with $h_i^1 = W_{ad}^T h_i^0 + b_{ad}$, where $W_{ad} \in \mathbb{R}^{d_e \times d_f}$, $b_{ad} \in \mathbb{R}^{d_f}$, and $d_f$ is a transformed dimension of internal features. The transformer-based contextualized language encoder encodes the token semantics based on the context, which resolve the polysemy of certain sentiment terms. For example, the term "cheap" is a positive sentiment when related to price, but is a negative sentiment when related to quality.

For an aspect a from the k total aspects, all contextualized representations of the sentiment words that modify aspect a may be pulled and their representations may be aggregated to a single representation of a in r as $h_{u,r}^{(a)} = h_j^1$, $w_j \in ST \cup r$ and $w_j$ modifies a. Users tend to use semantically consistent words for the same aspect in reviews. Therefore, sum-pooling aggregation handles both sentiments and frequencies of term mentions. All reviews $R^u$ from the user u may be aggregated using review-wise aggregation that is weighted by $\alpha_{u,r}^{(a)}$, which indicates the significance of each review's contribution to the overall understanding of u attention to aspect a:

$$\alpha_{u,r}^{(a)} = \frac{e^{tanh(w_{ex}^T[h_{u,r}^{(a)};a^{(u)}])}}{\sum_{r' \in R^u} e^{tanh(w_{ex}^T[h_{u,r'}^{(a)};a^{(u)}])}}$$

where [•;•] denotes a concatenation of tensors and $w_{ex} \in \mathbb{R}^{(d_f+d_a)}$ is a tensor of trainable weights. With the usefulness distribution $\alpha_{u,r}^{(a)}$, the terms $h_{u,r}^{(a)}$ of $R^u$ may be aggregated by weighted average pooling:

$$g_u^{(a)} = \sum_{r \in R^u} \alpha_{u,r}^{(a)} h_{u,r}^{(a)}$$

The term $g_u^{(a)} \in \mathbb{R}^{d_f}$ is a user attention representation for the aspect a. The term $G_u \in \mathbb{R}^{d_f \times k}$ denotes the matrix of $g_u^{(a)}$.

Some emotions may be conveyed without explicit sentiment word mentions. For example, in the third review example above, the phrase, "But this one feels like a pillow," does not include any overt sentiment tokens, but nonetheless expresses a strong sentiment of satisfaction with respect to comfort. This sentiment may be missed by annotation-based ASPE. However, implicit semantic modeling may be used to capture such sentiments. A global feature $h_{[CLS]}^1$ may be combined with a local context feature $h_{cnn} \in \mathbb{R}^{n_c}$ that is learned by a convolutional neural network (CNN) with an output channel of size $n_c$, a kernel size $n_k$ with max pooling, and two token-level features. The token-level features may include average and max pooling of $H_1$ to build a comprehensive multi-granularity review representation:

$$v_{u,r} = [h_{[CLS]}^1; h_{cnn}; \text{MaxPool}(H^1); \text{AvgPool}(H^1)],$$

$$h_{cnn} = \text{MaxPool}(\text{ReLU}(\text{ConvNN}_{1D(H^1)}))$$

where ReLU(•) represents a rectified linear unit activation function.

Review-wise aggregation may be applied without aspects for latent review embedding $v_u$:

$$\beta_{u,r} = \frac{e^{tanh(w_{in}^T v_{u,r})}}{\sum_{r' \in R^u} e^{w_{in}^T v_{u,r'}}}$$

$$v_u = \sum_{r \in R^u} \beta_{u,r} v_{u,r}$$

where $\beta_{u,r}$ is a counterpart of $\alpha_{u,r}^{(a)}$ in an implicit channel, $w_{im} \in \mathbb{R}^{d_{im}}$ is a trainable parameter, and $d_{im} = 3d_f + n_c$. Using similar steps, item implicit embeddings $v_t$ may also be determined.

The implicit features $v_u$ and $v_t$ and the explicit features $G_u$ and $G_t$ can be combined to provide the input for rating predictor to estimate scores $s_{u,t}$ by:

$$\hat{s}_{u,t} = b_u + b_t + \mathcal{F}_{ex}([v_u; v_t]) + \langle \gamma, \mathcal{F}_{im}([G_u; G_t]) \rangle$$

where $b_u$ and $b_t$ are biases, $\mathcal{F}_{ex}([v_u; v_t]): \mathbb{R}^{2d_f} \to \mathbb{R}$ is an explicit feature, and $\langle \gamma, \mathcal{F}_{im}([G_u; G_t]) \rangle$ is an implicit feature, with $\mathcal{F}_{im}: \mathbb{R}^{2d_{im} \times k} \to \mathcal{F}^k$. The feature terms represent multi-layer, fully-connected neural networks with rectified linear unit activation functions and with dropout to avoid overfitting. These neural networks model user attention and item property interactions of explicit and implicit channels, respectively. The operator ⟨•,•⟩ indicates an inner product, while $\gamma \in R^k$ and $\{b_u, b_r\} \in R$ are trainable parameters. The optimization function may use an $L_2$ regularization term of the trainable parameter set $\Theta$ and may be expressed as:

$$J(\Theta) = \sum_{r_{u,t} \in R} (s_{u,t} - \hat{s}_{u,t})^2 + L_2 reg$$

The optimization function may be optimization using backpropagation, as described in greater detail below.

Figure 3:
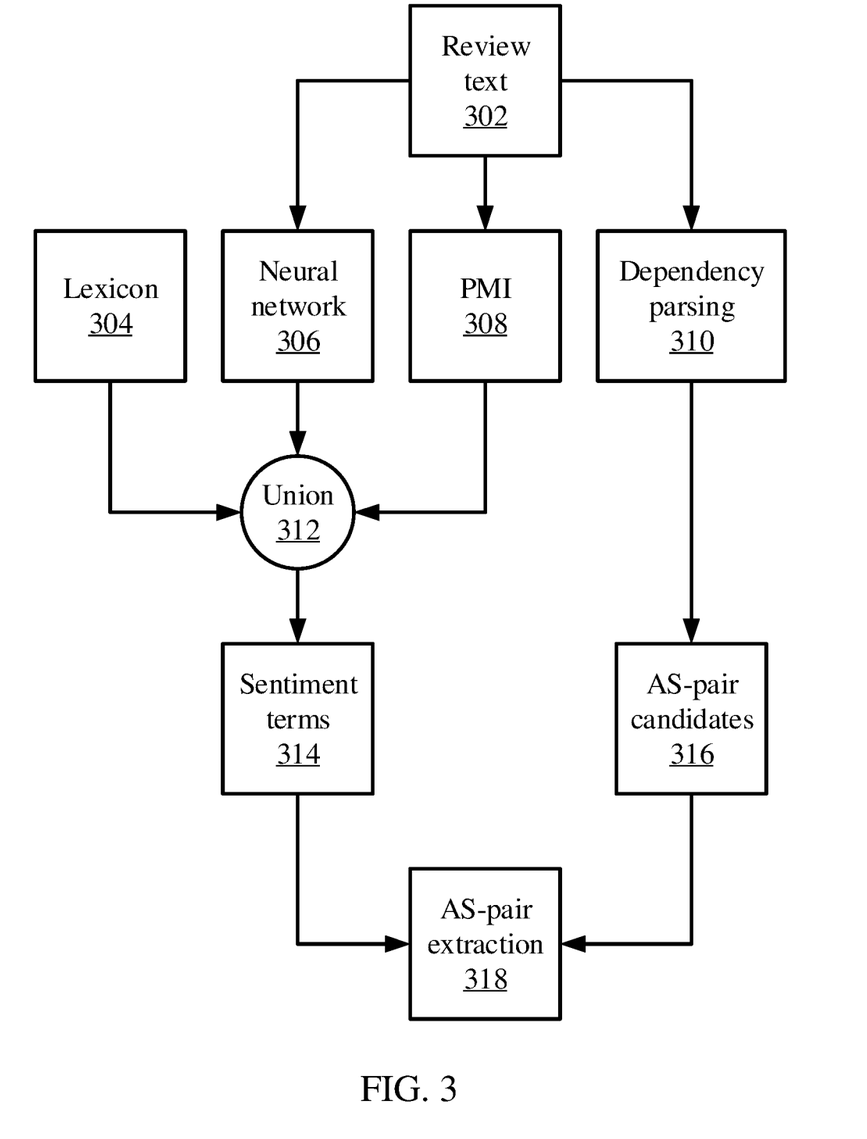
FIG. 3 is a block diagram illustrating a process pipeline for aspect-sentiment pair extraction that uses multiple sources for sentiment extraction, in accordance with an embodiment of the present invention.

Referring now to FIG. 3, a pipeline for ASPE 202 is shown. Multiple different models for generating sentiment terms are used, including a lexicon 304, neural network extraction 306, and pointwise mutual information extraction 308, the latter two of which use input review text 302 to identify likely sentiment terms. The different sets of sentiment terms are combined at union 312 to provide a full set of sentiment terms 314.

Dependency parsing 310 uses one or more dependency rules to parse the language of the input review text 302 and to identify pairs of words that have an aspect-sentiment relationship. This generates AS-pair candidates 316 from the input review text 302. Using the combined sentiment term set 314 to filer the candidates 316, a final set of aspect-similarity pairs can be extracted in block 318.

Figure 4:
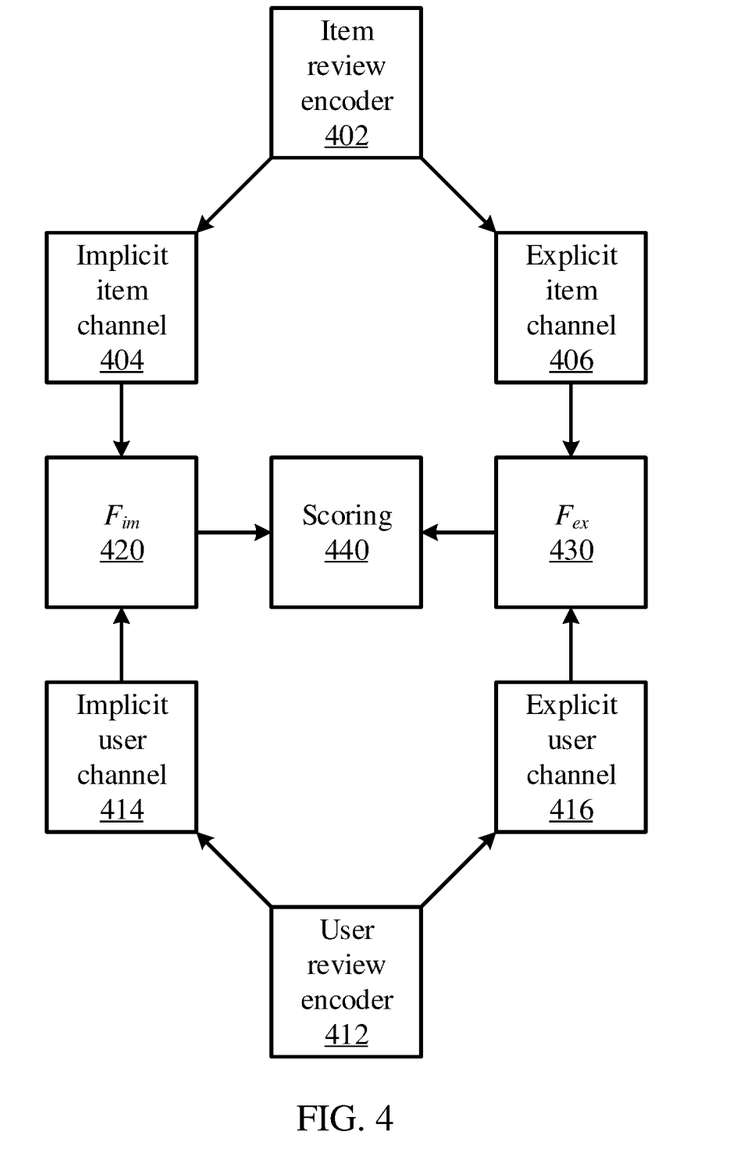
FIG. 4 is a block diagram illustrating a process pipeline for rating estimation that includes explicit and implicit sentiment recognition, in accordance with an embodiment of the present invention.

Referring now to FIG. 4, a pipeline for APRE 204 is shown. An item review encoder 402 generates embeddings of reviews for a given item, while a user review encoder 412 generates embeddings of reviews from a given user. Each has a respective implicit path and explicit path, including implicit item channel 404, explicit item channel 406, implicit user channel 414, and explicit user channel 416. The implicit paths are used as input for implicit features $\mathcal{F}_{im}$ 420 and the explicit paths are used as input for explicit features $\mathcal{F}_{ex}$ 430. The implicit features and explicit features are both used to perform scoring 440, generating a score that corresponds to an input review. Each of the item review encoder 402 and the user review encoder 412 may include a contextualized language encoder to process input text, as well as a variety of pooling and neural network processing operations.

Figure 5:
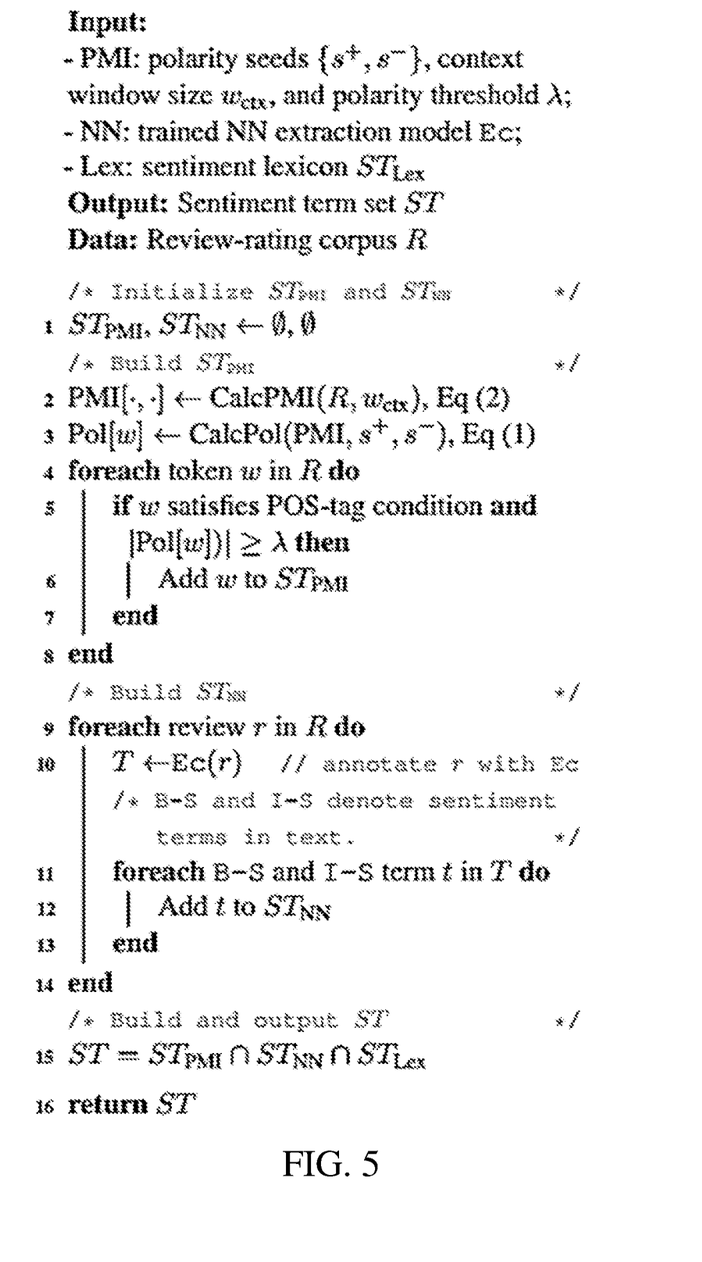
FIG. 5 is a pseudo-code segment of a process for generating a set of sentiment terms from a variety of sources, in accordance with an embodiment of the present invention.

Referring now to FIG. 5, pseudo-code is shown for extracting sentiment terms from a variety of sources. The code determines sets of sentiment words from multiple sources, using different methodologies. The code outputs a unified set of sentiment terms from the different sources.

Figure 6:
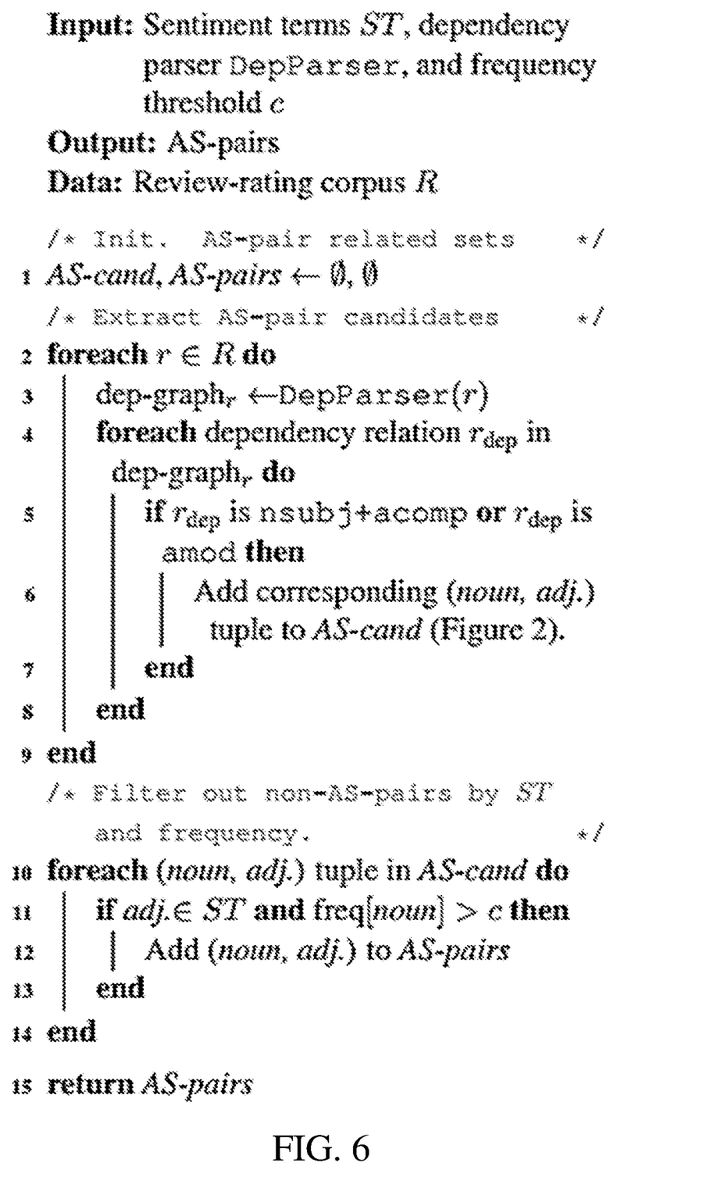
FIG. 6 is a pseudo-code segment of a process for extracting sentiment aspect-sentiment pairs from an input text, in accordance with an embodiment of the present invention.

Referring now to FIG. 6, pseudo-code is shown for implementing ASPE 202. The code takes as input the set of sentiment terms and outputs (aspect,sentiment) pairs, using a dependency parser to identify candidates within input text.

Figure 7:
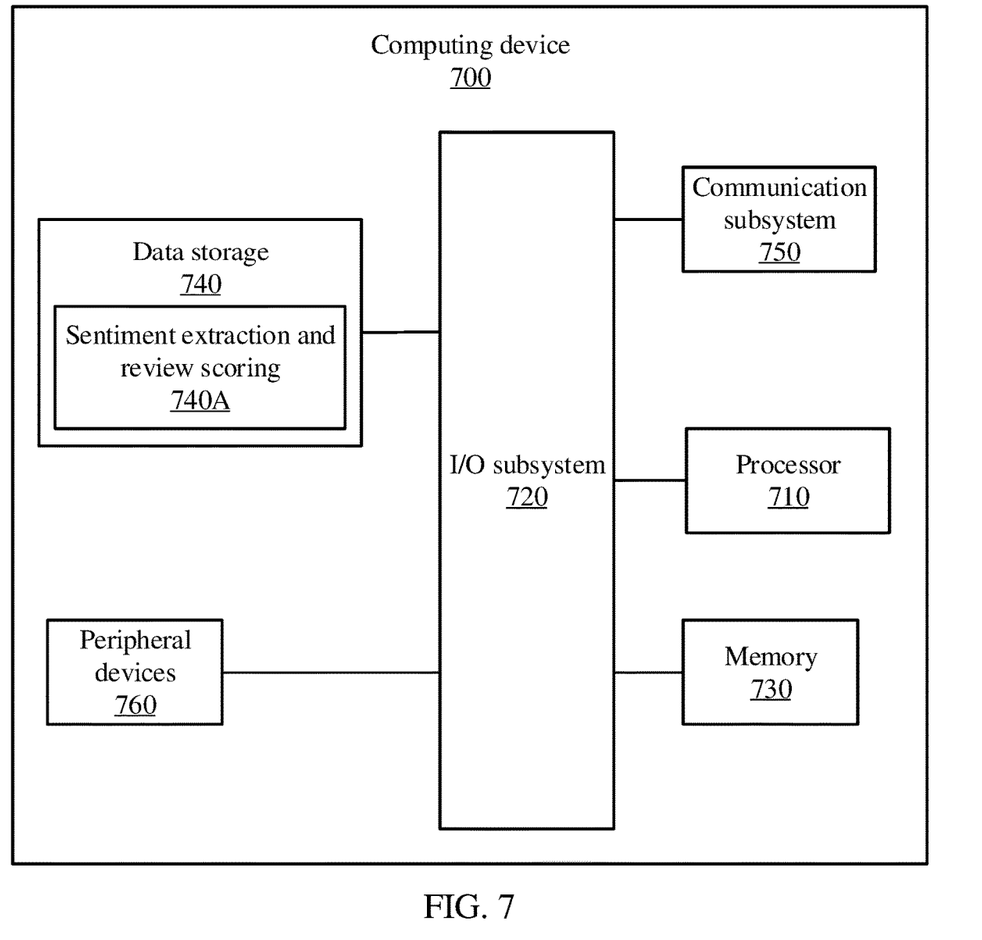
FIG. 7 is a block diagram of a computer system that is configured to perform sentiment extraction and review scoring, in accordance with an embodiment of the present invention.

Referring now to FIG. 7, an exemplary computing device 700 is shown, in accordance with an embodiment of the present invention. The computing device 700 is configured to perform sentiment extraction and review scoring.

The computing device 700 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 700 may be embodied as a one or more compute sleds, memory sleds, or other racks, sleds, computing chassis, or other components of a physically disaggregated computing device.

As shown in FIG. 7, the computing device 700 illustratively includes the processor 710, an input/output subsystem 720, a memory 730, a data storage device 740, and a communication subsystem 750, and/or other components and devices commonly found in a server or similar computing device. The computing device 700 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 730, or portions thereof, may be incorporated in the processor 710 in some embodiments.

The processor 710 may be embodied as any type of processor capable of performing the functions described herein. The processor 710 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 730 may be embodied as any type of volatile or non-volatile memory or data storage capable of performing the functions described herein. In operation, the memory 730 may store various data and software used during operation of the computing device 700, such as operating systems, applications, programs, libraries, and drivers. The memory 730 is communicatively coupled to the processor 710 via the I/O subsystem 720, which may be embodied as circuitry and/or components to facilitate input/output operations with the processor 710, the memory 730, and other components of the computing device 700. For example, the I/O subsystem 720 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 720 may form a portion of a system-on-a-chip (SOC) and be incorporated, along with the processor 710, the memory 730, and other components of the computing device 700, on a single integrated circuit chip.

The data storage device 740 may be embodied as any type of device or devices configured for short-term or long-term storage of data such as, for example, memory devices and circuits, memory cards, hard disk drives, solid state drives, or other data storage devices. The data storage device 740 can store program code 740A for sentiment extraction and review scoring. The communication subsystem 750 of the computing device 700 may be embodied as any network interface controller or other communication circuit, device, or collection thereof, capable of enabling communications between the computing device 700 and other remote devices over a network. The communication subsystem 750 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 700 may also include one or more peripheral devices 760. The peripheral devices 760 may include any number of additional input/output devices, interface devices, and/or other peripheral devices.

For example, in some embodiments, the peripheral devices 760 may include a display, touch screen, graphics circuitry, keyboard, mouse, speaker system, microphone, network interface, and/or other input/output devices, interface devices, and/or peripheral devices.

Of course, the computing device 700 may also include other elements (not shown), as readily contemplated by one of skill in the art, as well as omit certain elements. For example, various other sensors, input devices, and/or output devices can be included in computing device 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 8:
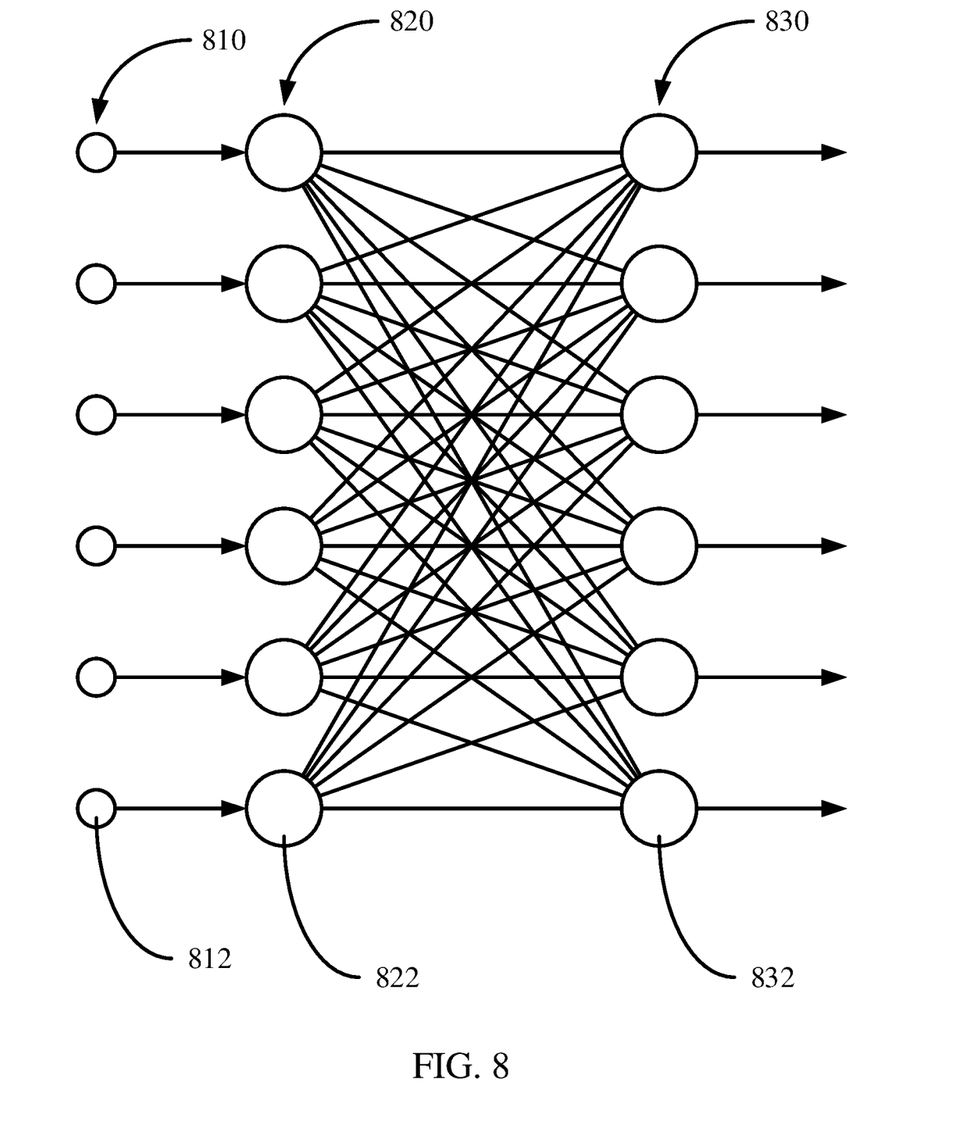
FIG. 8 is a block diagram of an exemplary neural network architecture that can be used to perform natural language processing, in accordance with an embodiment of the present invention.
Figure 9:
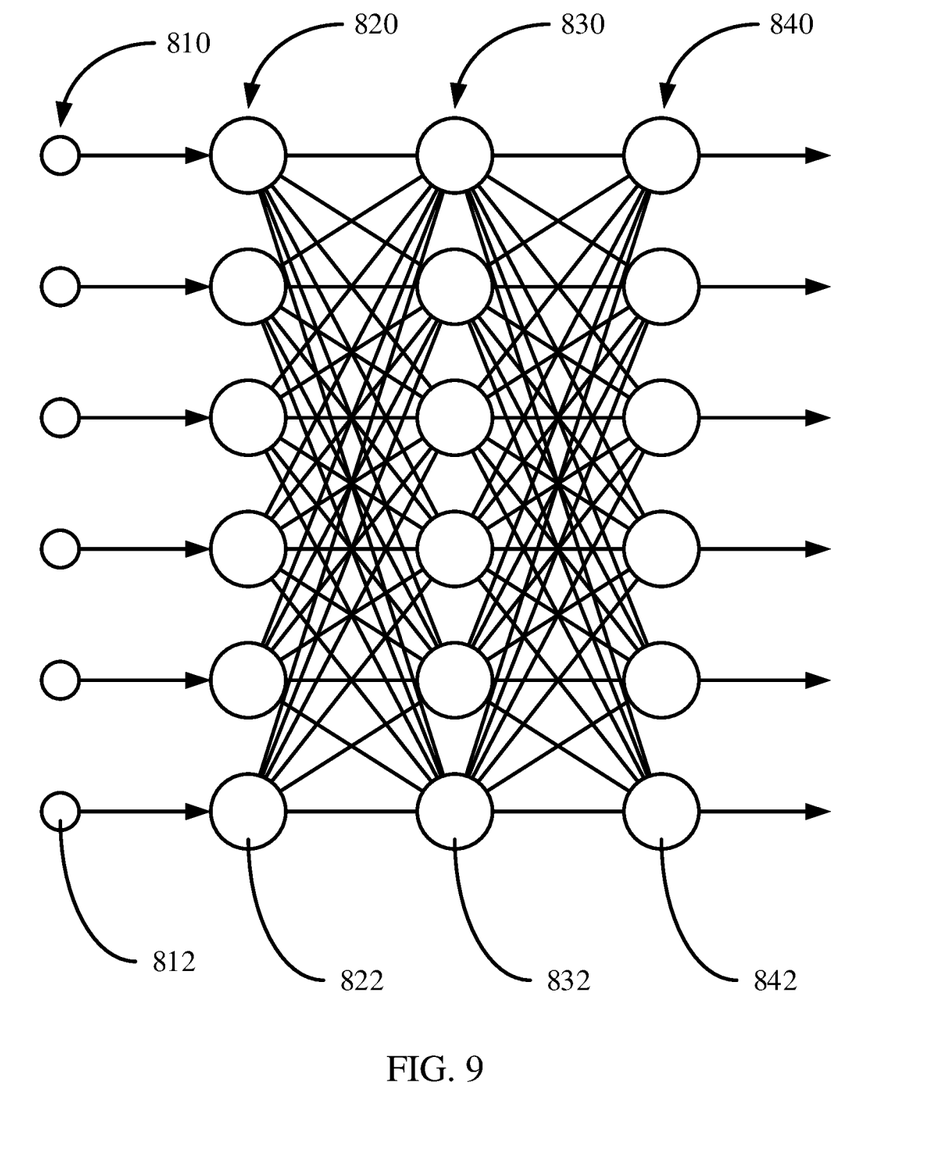
FIG. 9 is a block diagram of an exemplary deep neural network architecture that can be used to perform natural language processing, in accordance with an embodiment of the present invention.

Referring now to FIGS. 8 and 9, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 820 of source nodes 822, and a single computation layer 830 having one or more computation nodes 832 that also act as output nodes, where there is a single computation node 832 for each possible category into which the input example could be classified. An input layer 820 can have a number of source nodes 822 equal to the number of data values 812 in the input data 810. The data values 812 in the input data 810 can be represented as a column vector. Each computation node 832 in the computation layer 830 generates a linear combination of weighted values from the input data 810 fed into input nodes 820, and applies a non-linear activation function that is differentiable to the sum. The exemplary simple neural network can preform classification on linearly separable examples (e.g., patterns).

A deep neural network, such as a multilayer perceptron, can have an input layer 820 of source nodes 822, one or more computation layer(s) 830 having one or more computation nodes 832, and an output layer 840, where there is a single output node 842 for each possible category into which the input example could be classified. An input layer 820 can have a number of source nodes 822 equal to the number of data values 812 in the input data 810. The computation nodes 832 in the computation layer(s) 830 can also be referred to as hidden layers, because they are between the source nodes 822 and output node(s) 842 and are not directly observed. Each node 832, 842 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 832 in the one or more computation (hidden) layer(s) 830 perform a nonlinear transformation on the input data 812 that generates a feature space. The classes or categories may be more easily separated in the feature space than in the original data space.

Figure 10:
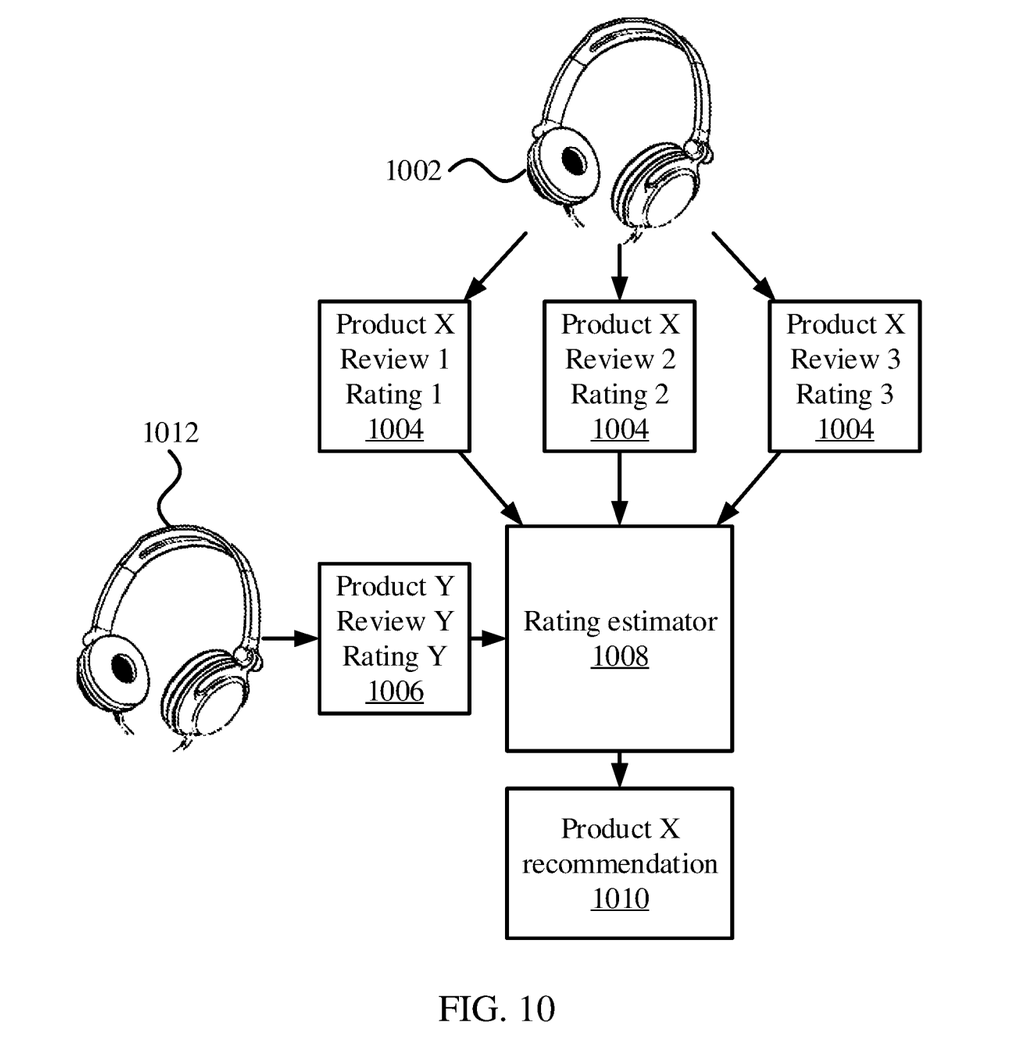
FIG. 10 is a block diagram illustrating how reviews of various products may be used to generate recommendations, in accordance with an embodiment of the present invention.

Referring now to FIG. 10, an example of product recommendation is shown. Two products, including first product 1002 and second product 1012, are shown. The first product 1002 has been reviewed by a number of different users, providing respective first product reviews 1004. The second product 1012 has been reviewed by a user of interest, generating second product review 1006.

The rating estimator 1008 accepts the first product reviews 1004 and the second product review 1006. Aspect-sentiment pairs are identified from the second product review 1006 to determine which features of the second product were considered to be important by the user of interest. Aspect-sentiment pairs of the first product reviews 1004 are similarity identified to identify features of the first product that are relevant to the priorities of the user of interest.

Based on this, the rating estimator 1008 estimates the rating that the user of interest would provide for the first product 1002 if the user of interest were to review the first product 1002. Based on this rating, a recommendation 1010 for the first product 1002 may be generated. For example, if the estimated rating is above a threshold value, the recommendation 1010 may recommend that the user try the first product.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented rating prediction method, comprising:
    extracting aspect-sentiment pairs from an input text;
    estimating an attention-property-aware rating for the input text using the extracted aspect-sentiment pairs with a neural network that captures implicit and explicit features of the text, including encoding item reviews and user reviews into respective explicit and implicit features and generating the rating as $\hat{s}_{u,t} = b_u + b_t + \mathcal{F}_{ex}([v_u; v_t]) + <\gamma, \mathcal{F}_{im}([G_u; G_t])>$ where $b_u$ is a user bias, $b_t$ is an item bias, $\underline{\mathcal{F}}(\bullet)$ is an explicit channel model, $\underline{\mathcal{F}}(\bullet)$ is an implicit channel model, $v_u$ and $v_t$ are respective user- and review-based token-level features, $G_u$ is a matrix of a user attention representation of an aspect, and $G_t$ is a matrix of an item attention representation of the aspect; and
    performing a response to the input text based on the estimated rating.

2. The method of claim 1, wherein extracting aspect-sentiment pairs includes determining a set of sentiment terms using a plurality of different sources.

3. The method of claim 2, wherein the plurality of different sources include a sentiment lexicon, a pointwise mutual information measurement of statistical word associations within a text corpus, and a coextraction model.

4. The method of claim 1, wherein extracting aspect-sentiment pairs includes identifying grammatical dependency relationships between words in the input text to generate candidate aspect-sentiment pairs.

5. The method of claim 4, wherein extracting aspect-sentiment pairs further includes filtering the candidate aspect-sentiment pairs to exclude pairs that do not include an aspect from a predetermined set of sentiment terms.

6. The method of claim 1, wherein explicit features characterize mentions of sentiment words and wherein implicit features characterize sentiment expressions that do not use sentiment words.

7. The method of claim 1, further comprising training the neural network using a training dataset that includes a set of written reviews and corresponding numerical ratings.

8. The method of claim 1, wherein performing the response includes identifying a product that a user would rate highly, based on the attention-property-aware rating, and recommending the product to the user.

9. A rating prediction system, comprising:
    a hardware processor; and
    a memory that stores a computer program, which, when executed by the hardware processor, causes the hardware processor to:
        extract aspect-sentiment pairs from an input text;
        estimate an attention-property-aware rating for the input text using the extracted aspect-sentiment pairs with a neural network that captures implicit and explicit features of the text, including encoding item reviews and user reviews into respective explicit and implicit features and generating the rating as $\hat{s}_{u,t} = b_u + b_t + \mathcal{F}_{ex}([v_u; v_t]) + <\gamma, \mathcal{F}_{im}([G_u; G_t])>$ where $b_u$ is a user bias, $b_t$ is an item bias, $\underline{\mathcal{F}}(\bullet)$ is an explicit channel model, $\underline{\mathcal{F}}(\bullet)$ is an implicit channel model, $v_u$ and $v_r$ are respective user- and review-based token-level features, $G_u$ is a matrix of a user attention representation of an aspect, and $G_t$ is a matrix of an item attention representation of the aspect; and
        perform a response to the input text based on the estimated rating.

10. The system of claim 9, wherein the computer program further causes the hardware processor to determine a set of sentiment terms using a plurality of different sources.

11. The system of claim 10, wherein the plurality of different sources include a sentiment lexicon, a pointwise mutual information measurement of statistical word associations within a text corpus, and a coextraction model.

12. The system of claim 9, wherein the computer program further causes the hardware processor to identify grammatical dependency relationships between words in the input text to generate candidate aspect-sentiment pairs.

13. The system of claim 12, wherein the computer program further causes the hardware processor to filter the candidate aspect-sentiment pairs to exclude pairs that do not include an aspect from a predetermined set of sentiment terms.

14. The system of claim 9, wherein explicit features characterize mentions of sentiment words and wherein implicit features characterize sentiment expressions that do not use sentiment words.

15. The system of claim 9, wherein the computer program further causes the hardware processor to train the neural network using a training dataset that includes a set of written reviews and corresponding numerical ratings.

16. The system of claim 9, wherein the computer program further causes the hardware processor to identify a product that a user would rate highly, based on the attention-property-aware rating, and recommending the product to the user.

* * * * *